(12) United States Patent
Kikuchi

(10) Patent No.: US 6,757,020 B1
(45) Date of Patent: Jun. 29, 2004

(54) DETECTING/SETTING THE ON/OFF STATE OF A DISPLAY IN A VIDEO CAMERA WITH MANUAL AND AUTOMATIC FUNCTION

(75) Inventor: Kenichi Kikuchi, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/530,419

(22) PCT Filed: Oct. 29, 1998

(86) PCT No.: PCT/JP98/04914

§ 371 (c)(1),
(2), (4) Date: May 1, 2000

(87) PCT Pub. No.: WO99/23818

PCT Pub. Date: May 14, 1999

(30) Foreign Application Priority Data

Oct. 30, 1997 (JP) .............................................. 9-298684

(51) Int. Cl.[7] .......................... H04N 5/222; G03B 13/00
(52) U.S. Cl. .................. 348/333.01; 396/137; 345/204; 345/211
(58) Field of Search ................................ 345/204, 211, 345/212; 396/137, 221, 223, 303, 374; 348/333.01, 333.04

(56) References Cited

U.S. PATENT DOCUMENTS 4,456,931 A * 6/1984 Toyoda et al. .............. 386/118
5,182,636 A * 1/1993 Kikuchi et al. .......... 348/225.1
5,223,935 A * 6/1993 Tsuji et al. .................. 348/364
5,235,428 A * 8/1993 Hirota et al. ............... 348/355
5,561,493 A * 10/1996 Takahashi ..................... 396/48
6,201,932 B1 * 3/2001 Tsujimoto ................... 396/225

FOREIGN PATENT DOCUMENTS

| JP | 10-336495 | 12/1998 |
|----|-----------|---------|
| JP | 10-341359 | 12/1998 |

* cited by examiner

Primary Examiner—Wendy R. Garber
Assistant Examiner—Paul W. Myers
(74) Attorney, Agent, or Firm—Westerman, Hattori, Daniels & Adrian, LLP

(57) ABSTRACT

It is an object of the invention to prevent a taken image which is contrary to the intention of the user, from being derived in a video camera which comprises means for disabling an operation of a video monitor for displaying a taken image, and in which an exposure adjustment can be manually performed. The video camera has: an optical view finder 50; a video monitor 44 for displaying a taken image; a manual exposure adjuster (58, 64); and manual-exposure adjustment inhibiting means (58) for detecting that an operation of the video monitor is set to be disabled, and for inhibiting an exposure adjustment of the manual exposure adjuster.

9 Claims, 7 Drawing Sheets

DETECTING/SETTING THE ON/OFF STATE OF A DISPLAY IN A VIDEO CAMERA WITH MANUAL AND AUTOMATIC FUNCTION

TECHNICAL FIELD

The present invention relates to a video camera such as a digital still camera or a video tape recorder integrated with a camera, and more particularly to a video camera having both an optical view finder and a video monitor for displaying a taken image.

BACKGROUND ART

In video cameras of the conventional art, automatization of an exposure adjustment, a white balance adjustment, or a focus adjustment is advancing. By contrast, in some video cameras, these adjustments are enabled to be manually set in order to reflect the taste of the user on a taken image.

A video camera of the conventional art comprises a video monitor for displaying a taken image, because of the requirement of checking the taken image in real time. When the video monitor is driven, the power consumption is increased. In order to enable long-term imaging, such a video camera is provided with also an optical view finder which does not require a power source.

In the case where an exposure adjustment, a white balance adjustment, or a focus adjustment is manually performed, in a state where a taken image is displayed on the video monitor, the user can directly visually check the degree at which such an adjustment exerts an effect on the taken image. By contrast, when the power supply to the video monitor is interrupted and the object is seen through the optical view finder, it is impossible to check the effect of the adjustment, and there is a fear that a taken image which is contrary to the intention of the user is derived and then recorded into a semiconductor memory or a magnetic tape.

It is an object of the invention to prevent a taken image which is contrary to the intention of the user, from being derived in a video camera which comprises means for disabling an operation of a video monitor for displaying a taken image, and in which an exposure adjustment, a white balance adjustment, or a focus adjustment can be manually performed.

DISCLOSURE OF INVENTION

In order to solve the problem, in a first invention of the application, a video camera comprises: an optical view finder; a video monitor for displaying a taken image; a manual exposure adjuster; and manual-exposure adjustment inhibiting means for detecting that an operation of the video monitor is set to be disabled, and for inhibiting an exposure adjustment of the manual exposure adjuster.

The video camera further comprises automatic exposure adjusting means for performing an automatic exposure adjustment during at least a period when the manual-exposure adjustment inhibiting means inhibits the exposure adjustment of the manual exposure adjuster.

In a second invention of the application, a video camera comprises: an optical view finder; a video monitor for displaying a taken image; a manual exposure adjuster; operation disablement setting means for setting an operation of the video monitor to be disabled; and disablement setting inhibiting means for detecting that the manual exposure adjuster operates, and for inhibiting setting of the operation disablement of the operation disablement setting means.

In a third invention of the application, a video camera comprises: an optical view finder; a video monitor for displaying a taken image; a manual white balance adjuster; and manual-white balance adjustment inhibiting means for detecting that an operation of the video monitor is set to be disabled, and for inhibiting a white balance adjustment of the manual white balance adjuster.

The video camera further comprises automatic white balance adjusting means for performing an automatic white balance adjustment during at least a period when the manual-white balance adjustment inhibiting means inhibits the white balance adjustment of the manual white balance adjuster.

In a fourth invention of the application, a video camera comprises: an optical view finder; a video monitor for displaying a taken image; a manual white balance adjuster; operation disablement setting means for setting an operation of the video monitor to be disabled; and disablement setting inhibiting means for detecting that the manual white balance adjuster operates, and for inhibiting setting of the operation disablement of the operation disablement setting means.

In a fifth invention of the application, a video camera comprises: an optical view finder; a video monitor for displaying a taken image; a manual focus adjuster; and manual-focus adjustment inhibiting means for detecting that an operation of the video monitor is set to be disabled, and for inhibiting focus adjustment of the manual focus adjuster.

The video camera further comprises automatic focus adjusting means for performing an automatic focus adjustment during at least a period when the manual-focus adjustment inhibiting means inhibits the focus adjustment of the manual focus adjuster.

In a sixth invention of the application, a video camera comprises: an optical view finder; a video monitor for displaying a taken image; a manual focus adjuster; operation disablement setting means for setting an operation of the video monitor to be disabled; and disablement setting inhibiting means for detecting that the manual focus adjuster operates, and for inhibiting setting of the operation disablement of the operation disablement setting means.

BEST MODE FOR CARRYING OUT THE INVENTION

Figure 1:
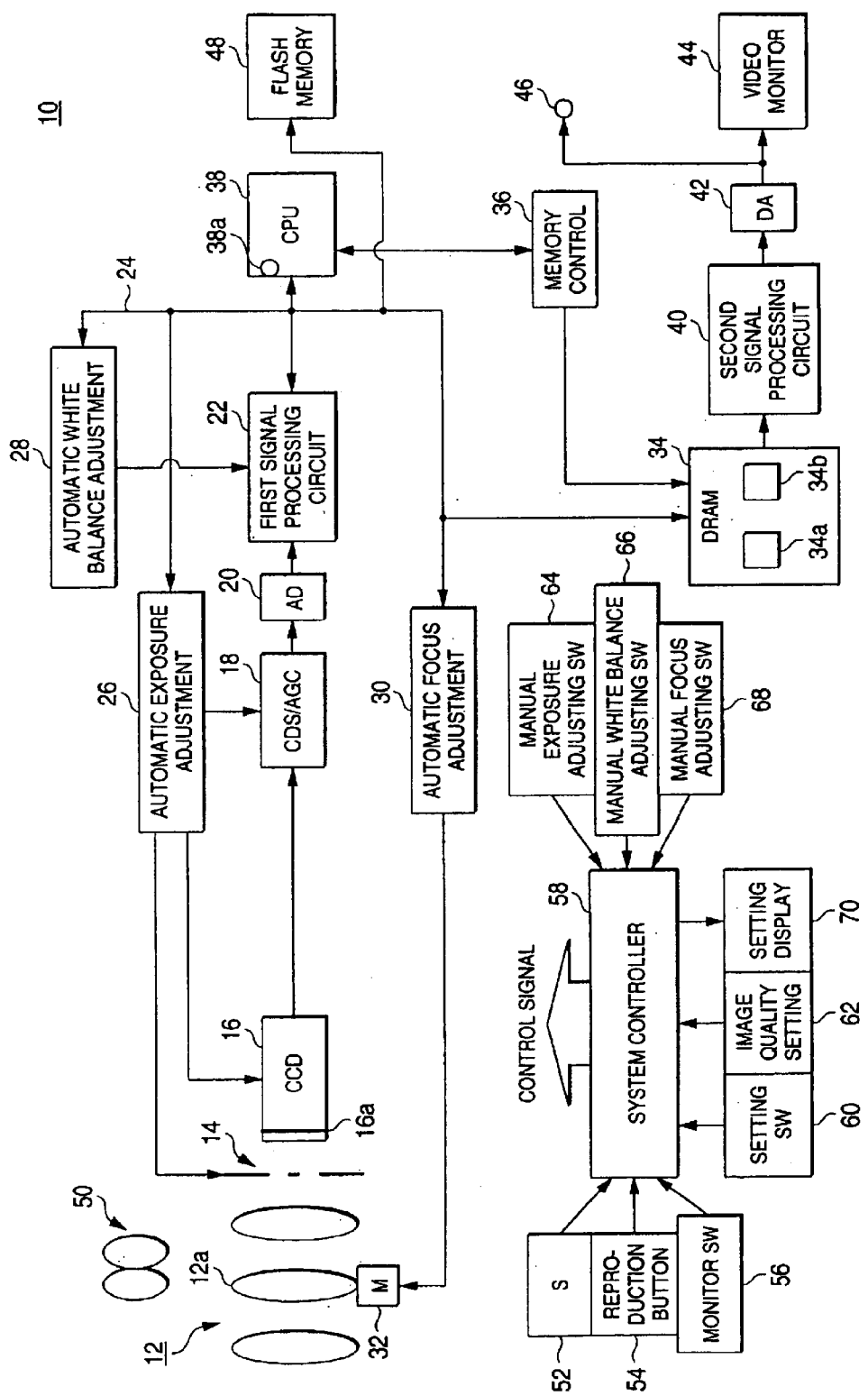
FIG. 1 is a functional block diagram showing a first embodiment of the invention.

Hereinafter, embodiments of the invention will be described with reference to the drawings. FIG. 1 is a functional block diagram showing a digital still camera which is a first embodiment of the invention. The digital still camera 10 includes a lens group 12. Light from an object and entering from the lens group 12 passes through an aperture mechanism 14 and then impinges on a CCD imager 16 via a color filter 16a in which Cy, Ye, Mg, and G are arranged in a mosaic pattern.

When a motion picture image is to be output from a video monitor 44 configured by a liquid crystal panel, the CCD imager 16 performs so-called pixel mixture reading, and simultaneously outputs pixel signals for two continuous lines from odd lines. The pixel signals for two lines are supplied to a CDS/AGC circuit 18. The CDS/AGC circuit 18 applies well-known noise reduction and level adjustment on the input pixel signals. The pixel signals which have been processed by the CDS/AGC circuit 18 are converted into 8-bit digital data or pixel data by an AD converter 20. Each of the pixel data has a color component of one of Cy, Ye, Mg, and G. Therefore, a first signal processing circuit 22 performs color separation on the four pixel data having different color components, and converts R, G, and B data which are obtained as a result of the color separation, into Y (=YL), U, and V data.

The Y data from the first signal processing circuit 22 is input to an automatic exposure adjusting circuit 26 via an internal bus 24. The automatic exposure adjusting circuit 26 operates when an automatic exposure adjusting mode is selected by operating a setting switch 60 which will be described later, accumulates the Y data for one field period to detect the brightness of the object, and feedback-controls the opening of the aperture mechanism 14, the electronic shutter speed of the CCD imager 16, or a signal amplification level in the CDS/AGC circuit 18 so that the brightness has a desired value.

On the other hand, the U and V data from the first signal processing circuit 22 are input to an automatic white balance adjusting circuit 28 via the internal bus 24. The automatic white balance adjusting circuit 28 operates when an automatic white balance adjusting mode is selected by operating the setting switch 60 which will be described later. Assuming that, when the color distribution of the whole of an object is averaged, color components constituting the color distribution cancel each other and a substantially white screen state can be approximated, the automatic white balance adjusting circuit feedback-controls the gain of the U data and/or that of the V data in the first signal processing circuit 22 so that the values which are respectively obtained by accumulating the U and V data for one field period equal to each other.

Furthermore, the Y data from the first signal processing circuit 22 is input to an automatic focus adjusting circuit 30 via the internal bus 24. The automatic focus adjusting circuit 30 operates when an automatic focus adjusting mode is selected by operating the setting switch 60 which will be described later, accumulates higher frequency components of the Y data for one field period to calculate a focus evaluation value, drives a focus motor 32 so that the value is maximum, and performs a so-called hill-climbing control in which positioning is conducted by moving forward and backward a focus lens 12a of the lens group 12 in the optical axis direction.

The Y, U, and V data which are produced as described above are written into a memory area 34a of a DRAM 34 via the internal bus 24 by a memory controlling circuit 36, and then output to a second signal processing circuit 40. When a motion picture image is to be output, the second signal processing circuit 40 applies predetermined horizontal interpolation and vertical interpolation on the Y, U, and V data or motion picture image data from the DRAM 34 so that the data coincide with the display screen size of the video monitor 44. The motion picture image data from the second signal processing circuit 40 are converted into analog signals by a DA converter 42, and then supplied to the video monitor 44 and output from an output terminal 46. Therefore, a motion picture image of an improved image quality is output from the video monitor 44.

Next, an operation of taking and recording a still picture will be described. When a shutter button 52 is pressed by the operator, a system controller 58 supplies a control signal to a CPU 38 via an interrupt terminal 38a. Therefore, the CPU 38 controls the CCD imager 16 so as to perform a so-called all-pixel reading process. As a result, the COD imager 16 outputs pixel signals for each line. Since the mosaic color filter 6a is attached to the CCD imager 16, Cy and Ye are alternatingly output in an odd line, and Mg and G are alternatingly output in an even line. The CDS/AGC circuit 18 applies noise reduction and level adjustment on the pixel signals in the same manner as described above, and the AD converter 20 converts the pixel signals from the CDS/AGC circuit 18 into digital data, i.e., pixel data. After outputting pixel signals for one frame, the CCD imager 16 is disabled, and pixel data for one frame which are produced by the AD converter 20 are directly supplied to the bus 24 without being processed by the first signal processing circuit 22, and then written into the memory area 34a by the memory controlling circuit 36.

The CPU 38 YUV-converts the pixel data in the memory area 34a by using a work area 34b, compresses Y, U, and V data after conversion, i.e., taken image data in accordance with the JPEG format, and records the compressed data into a flash memory 48. The memory controlling circuit 36 reads out the Cy, Ye, Mg, and G pixel data for each line, from the memory area 34a, and supplies the data to the second signal processing circuit 40. When an taken image is to be output, the second signal processing circuit 40 applies color separation and YUV conversion on the pixel data. As a result, a taken image (freeze picture) is output from the video monitor 44.

The digital still camera 10 comprises an optical view finder 50. Therefore, it is possible to check the object even in a state where the video monitor 44 is turned OFF by operating a monitor switch 56 which will be described later.

Next, an operation of reproducing a recorded still picture will be described. When a reproduction button 54 is pressed by the operator, the CPU 38 reads out desired compressed data from the flash memory 48, and expands the compressed data by using the work area 34b. The expanded image data (YUV data) are developed in the memory area 34a, and then read out. When a reproduced image is to be output, the second signal processing circuit 40 applies horizontal interpolation and vertical interpolation on the image data. A reproduced image in which the image quality is improved by the above is displayed on the video monitor 44.

Control programs for controlling the operation of the digital still camera 10 are previously recorded into the flash memory 48. In accordance with the control programs, the CPU 38 performs processes in the respective modes. On the other hand, in addition to the shutter button 52 and the reproduction button 54, the video monitor switch 56, the setting switch 60, an image quality setting switch 62, a manual exposure adjusting switch 64, a manual white balance adjusting switch 66, a manual focus adjusting switch 68, and a set status display device 70 are connected to the system controller 58. The video monitor switch 56 controls the power supply to the video monitor 44 to turn ON/OFF the power supply. The setting switch 60 is used for setting operation modes of the digital still camera 10, and will be described later in detail. The image quality setting switch 62 is used for setting the image quality of a digital image to be recorded. The manual exposure adjusting switch 64 is a switch for manually adjusting the exposure amount in a state where a manual exposure adjusting mode is set by the setting switch 60. The manual white balance adjusting switch 66 is a switch for manually adjusting the white balance in a state where a manual white balance adjusting mode is set by the setting switch 60. The manual focus adjusting switch 68 is a switch for manually adjusting the focus of the lens group 12 in a state where a manual focus adjusting mode is set by the setting switch 60. The set status display device 70 is configured by a monochrome liquid crystal panel and the like, and used for displaying set statuses of the operation modes of the digital still camera 10 which are set by operating the setting switch 60.

Figure 2:
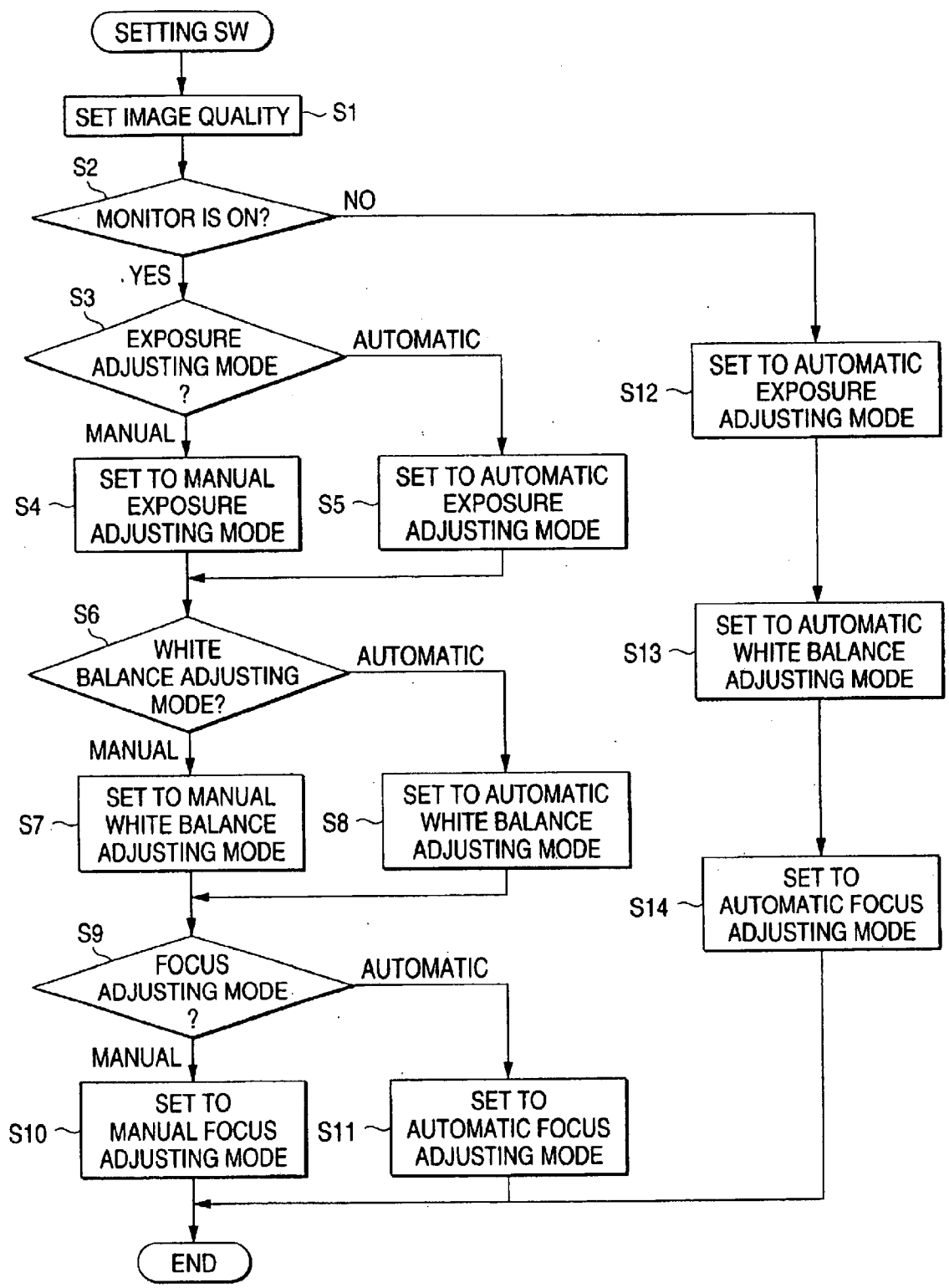
FIG. 2 is a flowchart showing the operation of the first embodiment.

Next, the operation of the system controller 58 in the case where the setting switch 60 is operated will be described with reference to the flowchart shown in FIG. 2. When a setting mode is set by operating the setting switch 60, image quality setting is first performed (S1). The image quality setting is setting of the pixel number (resolution) per one digital image which is to be recorded by the digital still camera 10. By operating the image quality setting switch 62, high resolution (640×480 pixels) or standard resolution (320×240 pixels) is set.

After the image quality is set, the system controller 58 recognizes the setting status of the monitor switch 56, thereby checking whether the video monitor 44 is in the ON state or not (S2). If the video monitor is in the ON state or a state where an image from the CCD imager 16 is displayed by the video monitor 44, selection of the exposure adjusting mode (S3), that of the white balance adjusting mode (S6), and that of the focus adjusting mode (S9) are sequentially performed.

In step S3, it is selected whether the exposure adjustment is to be performed manually or automatically. If manual is selected, the manual exposure adjusting mode is set (S4). In this state, the manual exposure adjustment by the manual exposure adjusting switch 64 is enabled. Specifically, the desired value (reference value) which is to be compared with the brightness of the object detected by the automatic exposure adjusting circuit 26 is increased or decreased by operating the manual exposure adjusting switch 64. A feedback control is conducted based on the increased or decreased reference value, thereby performing the manual exposure adjustment. If automatic is selected in step S3, the automatic exposure adjusting mode is set (S3). In this state, the reference value is not increased nor decreased by the automatic exposure adjusting circuit 26, and a feedback control is conducted based on the reference value, thereby performing the automatic exposure adjustment.

In step S6, it is selected whether the white balance adjustment is to be performed manually or automatically. If manual is selected, the manual white balance adjusting mode is set (S7). In this state, the manual white balance adjustment by the manual white balance adjusting switch 66 is enabled. Specifically, the gain of the U data and/or that of the V data in the first signal processing circuit 22 is directly increased or decreased by operating the manual white balance adjusting switch 66 without using a control signal from the automatic white balance adjusting circuit 28, thereby performing the manual white balance adjustment. If automatic is selected in step S6, the automatic white balance adjusting mode is set (S8). In this state, the gain of the U data and/or that of the V data in the first signal processing circuit 22 is feedback-controlled by using the control signal from the automatic white balance adjusting circuit 28, thereby performing the automatic white balance adjustment.

In step S9, it is selected whether the focus adjustment is to be performed manually or automatically. If manual is selected, the manual focus adjusting mode is set (S10). In this state, the manual focus adjustment by the manual focus adjusting switch 68 is enabled. Specifically, the focus motor 32 which moves forward and backward the focus lens 12*a* of the lens group 12 in the optical axis direction is directly driven by operating the manual focus adjusting switch 68 without using a control signal from the automatic focus adjusting circuit 30, thereby performing the manual focus adjustment. If automatic is selected in step S9, the automatic focus adjusting mode is set (S11). In this state, the focus motor 32 is driven by using the control signal from the automatic focus adjusting circuit 30, thereby performing the automatic focus adjustment.

If, in step S2, the video monitor 44 is in the OFF state or in a state where an image from the CCD imager 16 is not displayed by the video monitor 44 and the object is checked by using the optical view finder 50, selection of the exposure adjusting mode, that of the white balance adjusting mode, and that of the focus adjusting mode are not performed, and the exposure adjustment is compulsively set to the automatic exposure adjusting mode (S12), the white balance adjustment is set to the automatic white balance adjusting mode (S13), and the focus adjustment is set to the automatic focus adjusting mode (S14). In other words, in a state where the video monitor 44 is turned OFF, only the image quality setting which can be conducted by the user without seeing an image from the CCD imager 16 is performed.

In a state where the video monitor 44 is turned OFF, therefore, the automatic exposure adjusting mode, the automatic white balance adjusting mode, or the automatic focus adjusting mode is set, and these adjustments are not manually performed. Consequently, a taken image which is caused to be contrary to the intention of the user as a result of the situation that an adjusted image cannot be checked through the video monitor 44 is prevented from being derived and recorded into the flash memory 48.

The statuses of the settings through the setting switch 60 are displayed by the set status display device 70.

Figure 3:
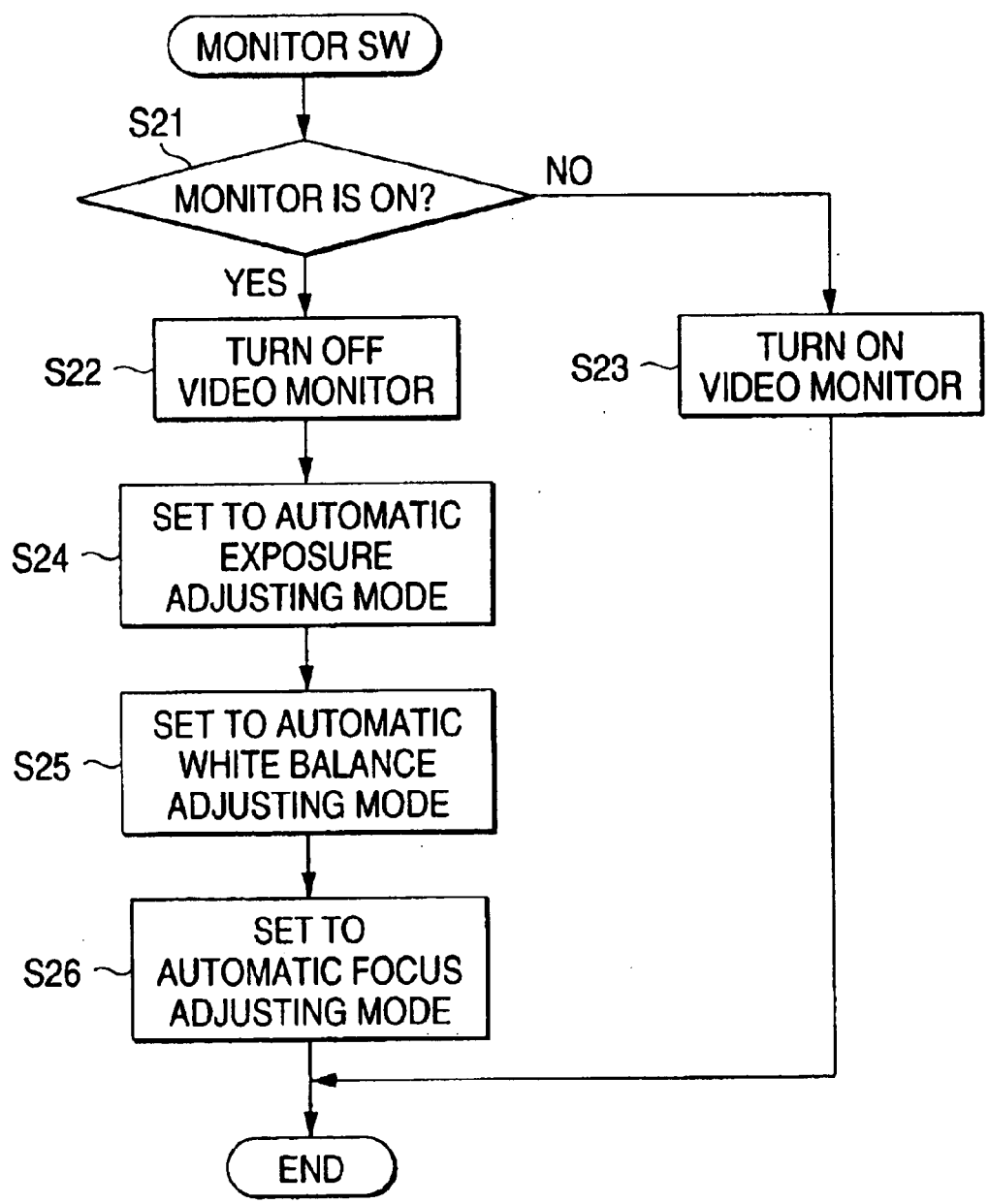
FIG. 3 is a flowchart showing the operation of the first embodiment.

Next, the operation of the system controller 58 in the case where the monitor switch 56 is operated will be described with reference to the flowchart shown in FIG. 3. When the monitor switch 56 is operated, the system controller 58 recognizes the setting status of the monitor switch 56, thereby checking whether the video monitor 44 is in the ON state or not (S21). If the video monitor is in the ON state, the power supply to the video monitor 44 is interrupted or turned OFF (S22), and, if in the OFF state, the power supply to the video monitor 44 is performed or turned ON (S23)

When the power supply to the video monitor 44 is performed or turned ON in step S23, the control is ended without performing a further process. By contrast, when the power supply to the video monitor 44 is interrupted or turned OFF in step S22, the exposure adjustment is compulsively set to the automatic exposure adjusting mode (S24), the white balance adjustment is set to the automatic white balance adjusting mode (S25), and the focus adjustment is set to the automatic focus adjusting mode (S26). When the video monitor 44 is turned OFF, therefore, settings are prevented from being cancelled to the manual exposure adjusting mode, the manual white balance adjusting mode, and the manual focus adjusting mode, and these adjustments are not manually performed. Consequently, a taken image which is caused to be contrary to the intention of the user as a result of the situation that an adjusted image cannot be checked through the video monitor 44 is prevented from being derived and recorded into the flash memory 48.

In the above, the operations in the case where the setting switch 60 and the monitor switch 56 are operated have been described. If the system controller 58 is configured so that, when the main power source of the digital still camera 10 is turned ON, the adjustments of the exposure, the white balance, and the focus are set to the automatic adjusting mode, steps S12, S13, and S14 shown in FIG. 2 are not necessary.

Next, a second embodiment will be described. In the first embodiment described above, the exposure, white balance, and focus adjustment modes are set to the automatic adjusting mode or the manual adjusting mode by the setting switch 60. In the second embodiment, the setting switch 60 is not disposed, the automatic adjustments are usually performed, and, when the manual exposure adjusting switch 64, the manual white balance adjusting switch 66, or the manual focus adjusting switch 68 is operated, the corresponding manual adjustment is performed.

Figure 4:
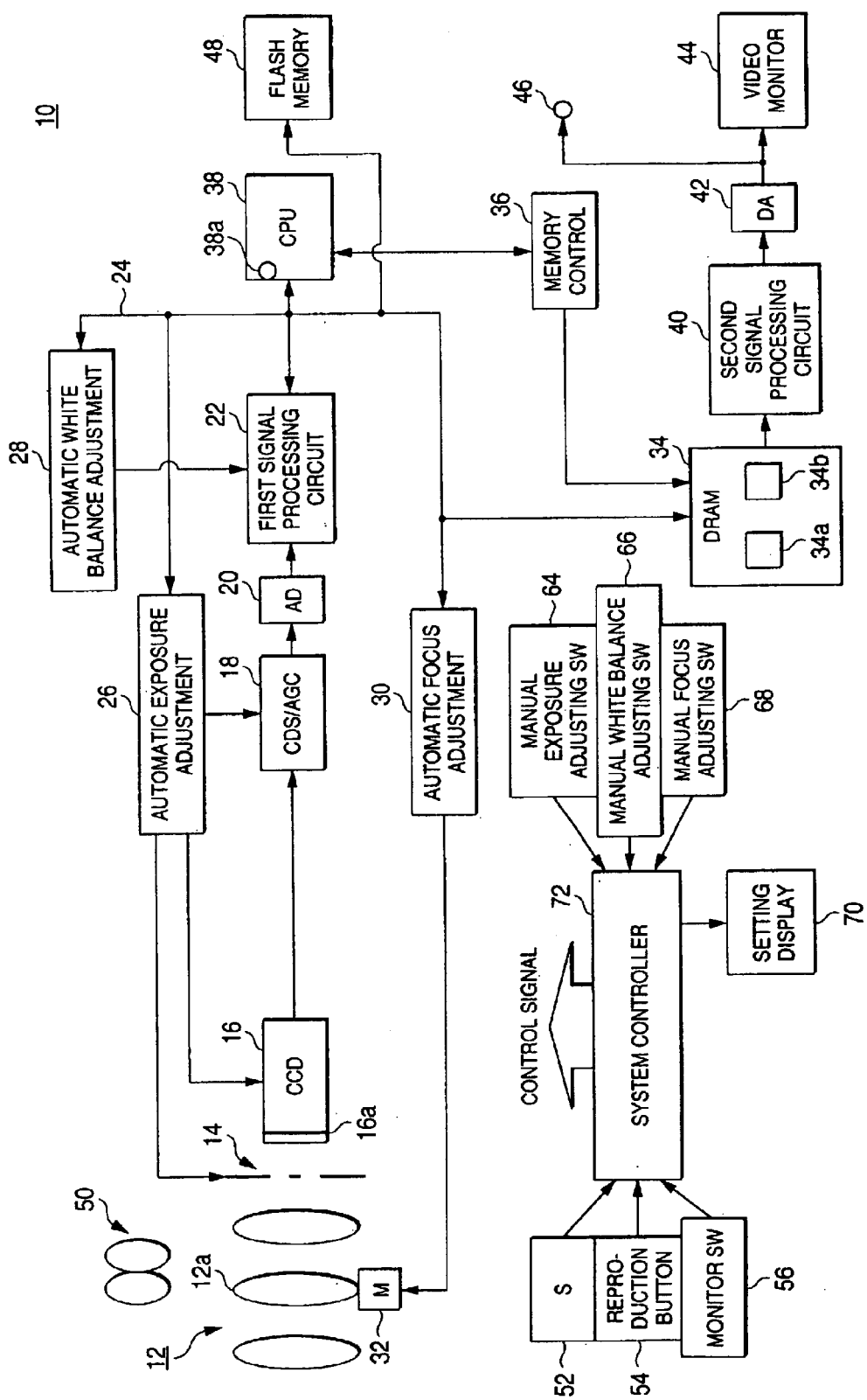
FIG. 4 is a functional block diagram showing a second embodiment of the invention.

FIG. 4 is a functional block diagram showing the second embodiment of the invention. The figure is identical with FIG. 1 showing the first embodiment except that the setting switch 60 and the image quality setting switch 62 are not disposed and a system controller 72 is disposed in place of the system controller 58. The description of the common portions is omitted.

Figure 5:
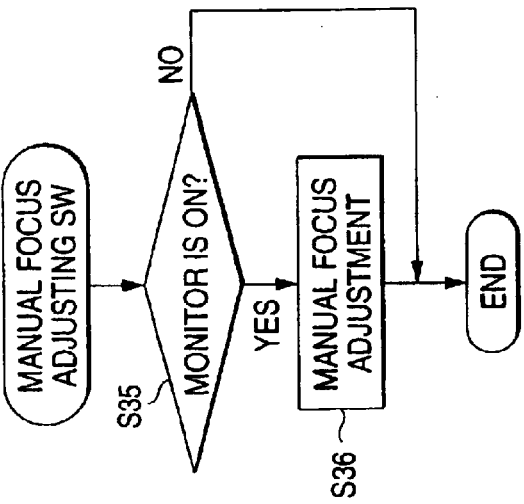
FIG. 5 is a flowchart showing the operation of the second embodiment.
Figure 5:
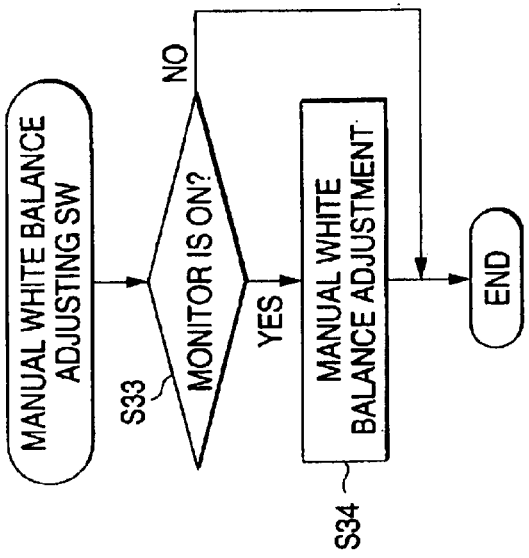
Figure 5:
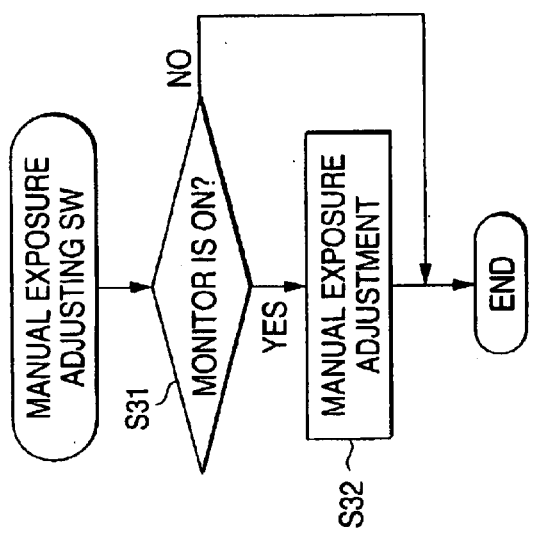

In FIG. 5, (A), (B), and (C) are flowcharts respectively showing operations of the system controller 72 in the cases where the manual exposure adjusting switch 64, the manual white balance adjusting switch 66, and the manual focus adjusting switch 68 are operated. As shown in (A) of FIG. 5, when the manual exposure adjusting switch 64 is operated, the system controller 72 recognizes the setting status of the monitor switch 56, thereby checking whether the video monitor 44 is in the ON state or not (S31). If the video monitor is in the ON state or a state where an image from the CCD imager 16 is displayed by the video monitor 44, the manual exposure adjustment is performed in accordance with the operation amount of the manual exposure adjusting switch 64 (S32). If the video monitor is not in the ON state or is in a state where an image from the CCD imager 16 is not displayed by the video monitor 44 and the object is checked by using the optical view finder 50, the manual exposure adjustment by the manual exposure adjusting switch 64 is not performed and the automatic exposure adjustment is performed.

As shown in (B) of FIG. 5, when the manual white balance adjusting switch 66 is operated, the system controller 72 recognizes the setting status of the monitor switch 56, thereby checking whether the video monitor 44 is in the ON state or not (S33). If the video monitor is in the ON state, the manual white balance adjustment is performed in accordance with the operation amount of the manual white balance adjusting switch 66 (S34). If the video monitor is in the OFF state, the manual white balance adjustment by the manual white balance adjusting switch 66 is not performed and the automatic white balance adjustment is performed.

As shown in (C) of FIG. 5, when the manual focus adjusting switch 68 is operated, the system controller 72 recognizes the setting status of the monitor switch 56, thereby checking whether the video monitor 44 is in the ON state or not (S35). If the video monitor is in the ON state, the manual focus adjustment is performed in accordance with the operation amount of the manual focus adjusting switch 68 (S36). If the video monitor is in the OFF state, the manual focus adjustment by the manual focus adjusting switch 68 is not performed and the automatic focus adjustment is performed.

In a state where the video monitor 44 is turned OFF, therefore, manual adjustments by using the manual exposure adjusting switch 64, the manual white balance adjusting switch 66, and the manual focus adjusting switch 68 cannot be performed. Consequently, a taken image which is caused to be contrary to the intention of the user as a result of the situation that an adjusted image cannot be checked through the video monitor 44 is prevented from being derived and recorded into the flash memory 48.

The operation of the system controller 72 in the case where the monitor switch 56 is operated is identical with that of the system controller 58 of the first embodiment in the case where the monitor switch 56 is operated. Also the operation in the case where the shutter button 52 or the reproduction button 54 is pressed is identical with that of the system controller 58. Therefore, their description is omitted. The set status display device 70 displays various set statuses of the digital still camera 10 which are set by operating the manual exposure adjusting switch 64, the manual white balance adjusting switch 66, and the manual focus adjusting switch 68.

Next, a third embodiment of the invention will be described. In the second embodiment described above, when the video monitor 44 is OFF, the operations of the exposure, white balance, and focus manual adjusting switches are made invalid. In the third embodiment, when the manual exposure adjusting switch 64, the manual white balance adjusting switch 66, or the manual focus adjusting switch 68 is operated, the video monitor is compulsively turned ON and the corresponding manual adjustment is performed.

Figure 6:
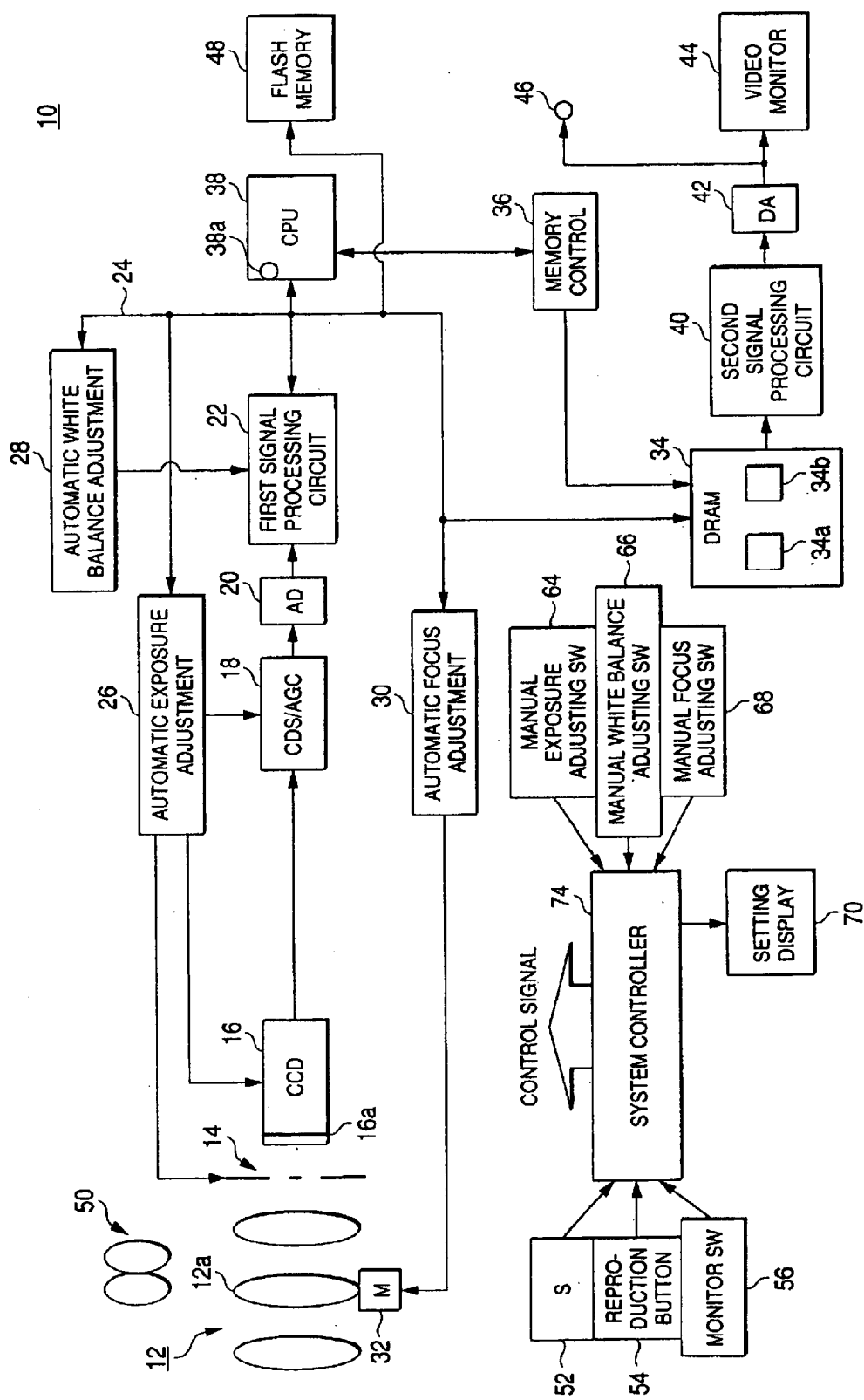
FIG. 6 is a functional block diagram showing a third embodiment of the invention.

FIG. 6 is a functional block diagram showing the third embodiment of the invention. The figure is identical with FIG. 4 showing the second embodiment except that a system controller 74 is disposed in place of the system controller 72. The description of the common portions is omitted.

Figure 7:
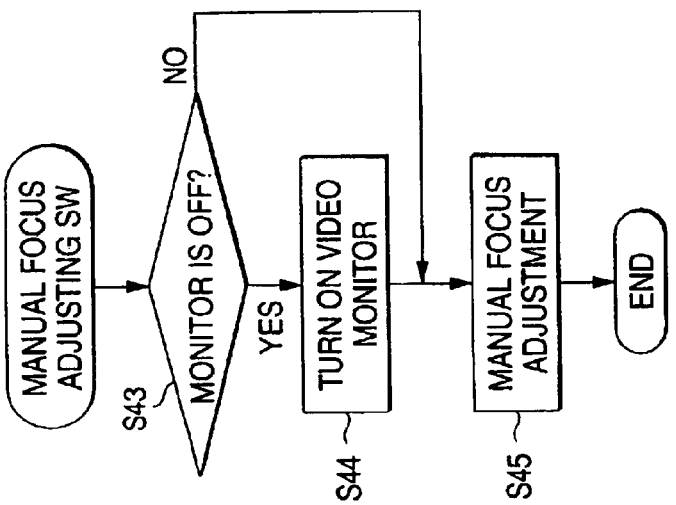
FIG. 7 is a flowchart showing the operation of the third embodiment.
Figure 7:
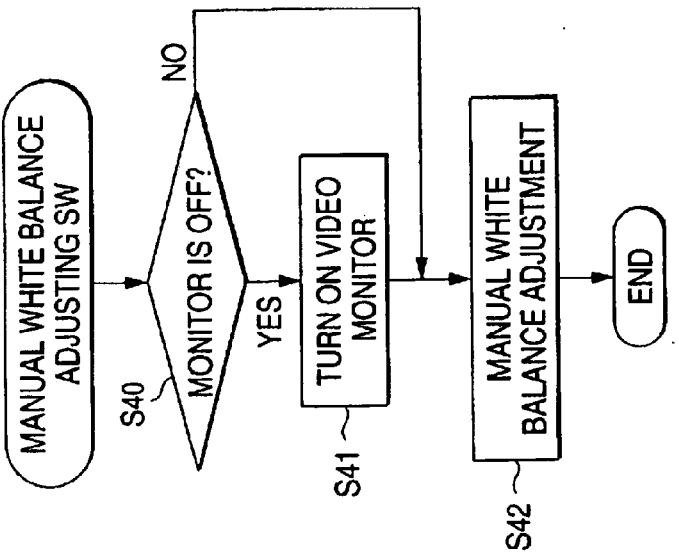
Figure 7:
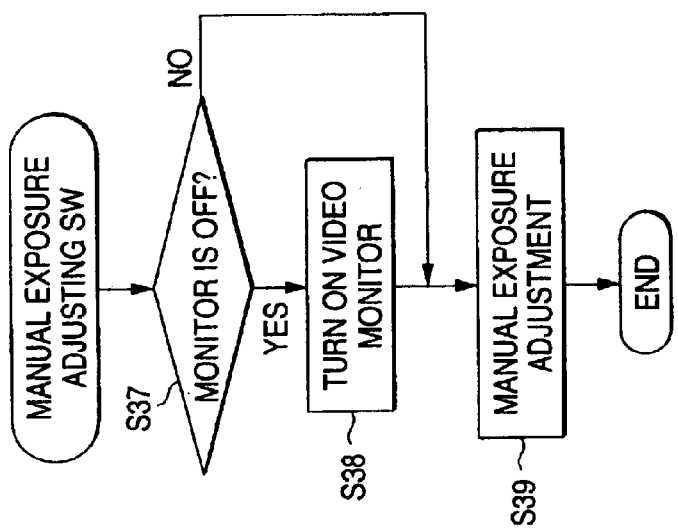

In FIG. 7, (A), (B), and (C) are flowcharts respectively showing operations of the system controller 74 in the cases where the manual exposure adjusting switch 64, the manual white balance adjusting switch 66, and the manual focus adjusting switch 68 are operated. As shown in (A) of FIG. 7, when the manual exposure adjusting switch 64 is operated, the system controller 74 recognizes the setting status of the monitor switch 56, thereby checking whether the video monitor 44 is in the OFF state or not (S37). If the video monitor is in the OFF state or a state where an image from the CCD imager 16 is not displayed by the video monitor 44 and the object is checked by using the optical view finder 50, the power source is compulsively supplied to the video monitor 44 to set the ON state (S38), and the manual exposure adjustment is performed in accordance with the operation amount of the manual exposure adjusting switch 64 (S39). If the video monitor is not in the OFF state or is in a state where an image from the CCD imager 16 is displayed by the video monitor 44, step S39 is immediately executed.

As shown in (B) of FIG. 7, when the manual white balance adjusting switch 66 is operated, the system controller 74 recognizes the setting status of the monitor switch 56, thereby checking whether the video monitor 44 is in the OFF state or not (S40). If the video monitor is in the OFF state, the power source is compulsively supplied to the video monitor 44 to set the ON state (S41), and the manual white balance adjustment is performed in accordance with the operation amount of the manual white balance adjusting switch 66 (S42). If the video monitor is in the ON state, step S42 is immediately executed.

As shown in (C) of FIG. 7, when the manual focus adjusting switch 68 is operated, the system controller 74 recognizes the setting status of the monitor switch 56, thereby checking whether the video monitor 44 is in the OFF state or not (S43). If the video monitor is in the OFF state, the power source is compulsively supplied to the video monitor 44 to set the ON state (S44), and the manual focus adjustment is performed in accordance with the operation amount of the manual focus adjusting switch 68 (S45). If the video monitor is in the ON state, step S45 is immediately executed.

Even in the case where the video monitor 44 is in the OFF state, when the manual exposure adjusting switch 64, the manual white balance adjusting switch 66, or the manual focus adjusting switch 68 is operated, therefore, the video monitor is compulsively set to the ON state. Consequently, a taken image which is caused to be contrary to the intention of the user as a result of the situation that an adjusted image cannot be checked through the video monitor 44 is prevented from being derived and recorded into the flash memory 48.

The operation of the system controller 74 in the case where the monitor switch 56 is operated is identical with that of the system controller 58 of the first embodiment in the case where the monitor switch 56 is operated. Also the operation in the case where the shutter button 52 or the reproduction button 54 is pressed is identical with that of the system controller 58. Therefore, their description is omitted.

In the above, the embodiments of the invention have been described. The invention may be implemented in any video camera having at least one of the manual exposure adjusting means, the manual white balance adjusting means, and the manual focus adjusting means. Furthermore, the invention is not restricted to a digital still camera, and may be implemented also in a video tape recorder integrated with a camera. It is a matter of course that the methods in the automatic exposure adjusting means, the automatic white balance adjusting means, and the automatic focus adjusting means are not restricted to those in the embodiments described above.

INDUSTRIAL APPLICABILITY

According to the invention, in a video camera which comprises means for disabling an operation of a video monitor for displaying a taken image, and in which an exposure adjustment, a white balance adjustment, or a focus adjustment can be manually performed, under a state where the operation of the video monitor is disabled, the exposure adjustment, the white balance adjustment, and the focus adjustment are blocked from being manually performed. Therefore, a taken image which is contrary to the intention of the user is prevented from being derived. The invention attains excellent effects.

What is claimed is:

1. A video camera comprising: an optical view finder; a video monitor for displaying a taken image; a manual exposure adjuster; and manual-exposure adjustment inhibiting means for detecting that an operation of said video monitor is set to be disabled, and for inhibiting an exposure adjustment of said manual exposure adjuster.

2. A video camera according to claim 1, wherein said video camera further comprises automatic exposure adjusting means for performing an automatic exposure adjustment during at least a period when said manual-exposure adjustment inhibiting means inhibits the exposure adjustment of said manual exposure adjuster.

3. A video camera comprising: an optical view finder; a video monitor for displaying a taken image; a manual exposure adjuster; operation disablement setting means for setting an operation of said video monitor to be disabled; and disablement setting inhibiting means for detecting that said manual exposure adjuster operates, and for inhibiting setting of the operation disablement of said operation disablement setting means.

4. A video camera comprising: an optical view finder; a video monitor for displaying a taken image; a manual white balance adjuster; and manual-white balance adjustment inhibiting means for detecting that an operation of said video monitor is set to be disabled, and for inhibiting a white balance adjustment of said manual white balance adjuster.

5. A video camera according to claim 4, wherein said video camera further comprises automatic white balance adjusting means for performing an automatic white balance adjustment during at least a period when said manual-white balance adjustment inhibiting means inhibits the white balance adjustment of said manual white balance adjuster.

6. A video camera comprising: an optical view finder; a video monitor for displaying a taken image; a manual white balance adjuster; operation disablement setting means for setting an operation of said video monitor to be disabled; and disablement setting inhibiting means for detecting that said manual white balance adjuster operates, and for inhibiting setting of the operation disablement of said operation disablement setting means.

7. A video camera comprising: an optical view finder; a video monitor for displaying a taken image; a manual focus adjuster; and manual-focus adjustment inhibiting means for detecting that an operation of said video monitor is set to be disabled, and for inhibiting focus adjustment of said manual focus adjuster.

8. A video camera according to claim 7, wherein said video camera further comprises automatic focus adjusting means for performing an automatic focus adjustment during at least a period when said manual-focus adjustment inhibiting means inhibits the focus adjustment of said manual focus adjuster.

9. A video camera comprises: an optical view finder; a video monitor for displaying a taken image; a manual focus adjuster; operation disablement setting means for setting an operation of said video monitor to be disabled; and disablement setting inhibiting means for detecting that said manual focus adjuster operates, and for inhibiting setting of the operation disablement of said operation disablement setting means.

* * * * *